United States Patent
Cheng et al.

(10) Patent No.: US 10,803,866 B2
(45) Date of Patent: Oct. 13, 2020

(54) INTERFACE INTELLIGENT INTERACTION CONTROL METHOD, APPARATUS AND SYSTEM, AND STORAGE MEDIUM

(71) Applicant: BAIDU ONLINE NETWORK TECHNOLOGY (BEIJING) CO., LTD., Haidian District, Beijing (CN)

(72) Inventors: Gaofei Cheng, Beijing (CN); Xiangtao Jiang, Beijing (CN); Ben Xu, Beijing (CN); Linxin Ou, Beijing (CN); Qin Xiong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 43 days.

(21) Appl. No.: 16/114,693

(22) Filed: Aug. 28, 2018

(65) Prior Publication Data

US 2019/0066682 A1 Feb. 28, 2019

(30) Foreign Application Priority Data

Aug. 29, 2017 (CN) .......................... 2017 1 0757704

(51) Int. Cl.
*G10L 15/22* (2006.01)
*G06F 16/638* (2019.01)
(Continued)

(52) U.S. Cl.
CPC ............ *G10L 15/22* (2013.01); *G06F 16/638* (2019.01); *G10L 15/02* (2013.01); *G10L 15/26* (2013.01);
(Continued)

(58) Field of Classification Search
CPC combination set(s) only.
See application file for complete search history.

(56) References Cited

U.S. PATENT DOCUMENTS 9,678,712 B2 * 6/2017 Griffiths ............. G05B 19/0426
10,262,655 B2 * 4/2019 Lovitt ..................... G10L 17/10
(Continued)

FOREIGN PATENT DOCUMENTS

| JP | A-2006-330576 A | 12/2006 |
|---|---|---|
| JP | 2011-049705 A | 3/2011 |
| JP | 2014-132342 A | 7/2014 |

OTHER PUBLICATIONS

European Search Report dated Feb. 1, 2019 for related European Patent Application No. 18190319.6; 7 Pages.
(Continued)

*Primary Examiner* — Linda Wong
(74) *Attorney, Agent, or Firm* — Brooks Kushman PC

(57) ABSTRACT

The present disclosure provides an interface intelligent interaction control method, apparatus and system, and a storage medium, wherein the method comprises: receiving user-input speech information, and obtaining a speech recognition result; determining scenario elements associated with the speech recognition result; generating an entry corresponding to each scenario element and sending the speech recognition result and the entry to a cloud server; receiving an entry which is best matched with the speech recognition result, returned by the cloud server and selected from the received entries; performing an interface operation corresponding to the best-matched entry. The solution of the present disclosure can be applied to improve flexibility and accuracy of the speech control.

20 Claims, 6 Drawing Sheets

(51) Int. Cl.
*G10L 15/02* (2006.01)
*G10L 15/26* (2006.01)
(52) U.S. Cl.
CPC .. *G10L 2015/221* (2013.01); *G10L 2015/225* (2013.01); *G10L 2015/228* (2013.01)

(56) References Cited

U.S. PATENT DOCUMENTS

| | | | |
|---|---|---|---|
| 2002/0198714 A1* | 12/2002 | Zhou | G10L 15/1822 704/252 |
| 2013/0041666 A1 | 2/2013 | Bak | |
| 2014/0163977 A1* | 6/2014 | Hoffmeister | G10L 15/32 704/232 |
| 2015/0382047 A1 | 12/2015 | Van Os et al. | |
| 2016/0042748 A1* | 2/2016 | Jain | G06F 40/30 704/9 |
| 2016/0071519 A1* | 3/2016 | Hoffmeister | G10L 15/32 704/232 |
| 2016/0253430 A1* | 9/2016 | Shapira | G06F 3/04883 707/722 |
| 2016/0378747 A1 | 12/2016 | Orr et al. | |
| 2017/0068423 A1 | 3/2017 | Napolitano et al. | |
| 2017/0084274 A1* | 3/2017 | Kim | G10L 15/02 |
| 2017/0148436 A1* | 5/2017 | Sugiura | G10L 15/14 |
| 2017/0236512 A1* | 8/2017 | Williams | G06F 16/68 381/79 |
| 2017/0249425 A1* | 8/2017 | Narayanaswamy | G06F 19/00 |
| 2018/0137857 A1* | 5/2018 | Zhou | G10L 15/32 |
| 2019/0228764 A1* | 7/2019 | Taki | G10L 15/22 |
| 2019/0287519 A1* | 9/2019 | Ediz | G10L 15/197 |
| 2020/0175980 A1* | 6/2020 | Li | G10L 15/22 |

OTHER PUBLICATIONS

Japanese Office Action dated Jul. 26, 2019 for related Japanese Patent Application No. JP 2018-158444; 2 Pages.
Korean Office Action dated Jan. 21, 2020 or related Korean Patent Application No. 10-2018-0101505; 7 Pages.

\* cited by examiner

INTERFACE INTELLIGENT INTERACTION CONTROL METHOD, APPARATUS AND SYSTEM, AND STORAGE MEDIUM

The present application claims the priority of Chinese Patent Application No. 201710757704.7, filed on Aug. 29, 2017, with the title of "Interface intelligent interaction control method, apparatus and system, and storage medium". The disclosure of the above applications is incorporated herein by reference in its entirety.

FIELD OF THE DISCLOSURE

The present disclosure relates to computer application technologies, and particularly to an interface intelligent interaction control method, apparatus and system, and a storage medium.

BACKGROUND OF THE DISCLOSURE

As technologies develop, there are more and more smart devices having a speech interaction function.

A user may perform speech control for the smart devices. For example, the user may send speech information and requires a smart device to perform a certain operation.

Upon receiving the user-input speech information, the smart device may send it to a cloud server, and receive an instruction or found resource returned by the cloud server after performing the speech recognition, and correspondingly, the smart device performs an operation corresponding to the instruction or display the resource.

However, the above manner has certain problems in practical application, for example:

Speech control is usually only with respect to a system-level instruction. An instruction set returned by the cloud server is fixed. It is impossible to perform a corresponding operation for an instruction absent from the instruction set. Assuming that the current interface displays a "Favorites" button and the user sends "Favorites" speech information, but this instruction is not stored in the cloud server, a corresponding operation cannot be performed. It can be seen that the current speech control manner has large limitations.

In addition, it is assumed that the current interface displays 10 movies including name and playing address of each movie, which all are unknown by the cloud server. As such, if the user wants to see a certain movie therein and after the user speaks the name of the movie, the cloud server does not know what the user wants to see is a movie displayed by on the current interface, the cloud server can only search for the movie name, and a returned result is probably not what the user wants to see, e.g., other movies with the same or similar name, thereby reducing the accuracy of speech control.

SUMMARY OF THE DISCLOSURE

In view of the above, the present disclosure provides an interface intelligent interaction control method, apparatus and system, and a storage medium, which can improve flexibility and accuracy of the speech control.

Specific technical solutions are as follows:

An interface intelligent interaction control method, comprising:

receiving user-input speech information, and obtaining a speech recognition result;

determining scenario elements associated with the speech recognition result;

generating an entry corresponding to each scenario element and sending the speech recognition result and the entry to a cloud server;

receiving an entry which is best matched with the speech recognition result, returned by the cloud server and selected from the received entries;

performing an interface operation corresponding to the best-matched entry.

According to a preferred embodiment of the present disclosure, the obtaining a speech recognition result comprises:

sending the speech information to the cloud server;

receiving the speech recognition result returned by the cloud server after performing speech recognition for the speech information.

According to a preferred embodiment of the present disclosure, the generating an entry corresponding to each scenario element comprises:

each entry includes: an element label and a corresponding self-defined operation behavior information;

the performing an interface operation corresponding to the best-matched entry comprises;

performing an interface operation according to the self-defined operation behavior information in the best-matched entry.

An interface intelligent interaction control method, comprising:

receiving a speech recognition result and an entry from a smart device, wherein the speech recognition result is a speech recognition result of user-input speech information received by the smart device, and the entry is a corresponding entry generated for each scenario element after the smart device determines the scenario elements associated with the speech recognition result;

selecting an entry best matched with the speech recognition result from the received entries, and returning the best-matched entry to the smart device so that the smart device performs an interface operation corresponding to the best-matched entry.

According to a preferred embodiment of the present disclosure, before receiving the speech recognition result and the entry from the smart device, the method further comprises:

receiving the speech information sent from the smart device;

performing speech recognition for the speech information to obtain the speech recognition result, and returning the speech recognition result to the smart device.

According to a preferred embodiment of the present disclosure, each entry includes: a label and a corresponding self-defined operation behavior information;

the selecting an entry best matched with the speech recognition result from the received entries comprises:

selecting the entry best matched with the speech recognition result from the received entries, according to the element label.

According to a preferred embodiment of the present disclosure, the selecting the entry best matched with the speech recognition result from the received entries, according to the element label comprises:

for each entry, respectively calculating an edit distance between the element label of the entry and the speech recognition result;

regarding an entry corresponding to the edit distance with a minimum value as the best-matched entry.

According to a preferred embodiment of the present disclosure, each entry further comprises one or all of the following: an x value and a y value indicative of a row position and a column position where the scenario element lies, and an index value indicative of an arrangement serial number of the scenario element;

the selecting an entry best matched with the speech recognition result from the received entries comprises:

according to the x value and y value or according to the index value, selecting the entry best matched with the speech recognition result from the received entries.

A smart device, comprising a first obtaining unit, a first control unit and a second control unit;

the first obtaining unit is configured to receive user-input speech information, and obtain a speech recognition result;

the first control unit is configured to determine scenario elements associated with the speech recognition result, generate an entry corresponding to each scenario element, send the speech recognition result and the entry to a cloud server, and receive an entry which is best matched with the speech recognition result, returned by the cloud server and selected from the received entries;

the second control unit is configured to perform an interface operation corresponding to the best-matched entry.

According to a preferred embodiment of the present disclosure, the first obtaining unit is further configured to, send the speech information to the cloud server;

receive the speech recognition result returned by the cloud server after performing speech recognition for the speech information.

According to a preferred embodiment of the present disclosure, each entry includes: an element label and a corresponding self-defined operation behavior information;

the second control unit performs an interface operation according to the self-defined operation behavior information in the best-matched entry.

A cloud server, comprising a second obtaining unit and a matching unit;

the second obtaining unit is configured to receive a speech recognition result and an entry from a smart device, wherein the speech recognition result is a speech recognition result of user-input speech information received by the smart device, and the entry is a corresponding entry generated for each scenario element after the smart device determines the scenario elements associated with the speech recognition result;

the matching unit is configured to select an entry best matched with the speech recognition result from the received entries, and return the best-matched entry to the smart device so that the smart device performs an interface operation corresponding to the best-matched entry.

According to a preferred embodiment of the present disclosure, the second obtaining unit is further configured to, before receiving the speech recognition result and the entry from the smart device, receive the speech information sent from the smart device;

perform speech recognition for the speech information to obtain the speech recognition result, and return the speech recognition result to the smart device.

According to a preferred embodiment of the present disclosure, each entry includes: a label and a corresponding self-defined operation behavior information;

the matching unit selects the entry best matched with the speech recognition result from the received entries, according to the element label.

According to a preferred embodiment of the present disclosure, the matching unit, for each entry, respectively calculates an edit distance between the element label of the entry and the speech recognition result, and then regards an entry corresponding to the edit distance with a minimum value as the best-matched entry.

An interface intelligent interaction control system, comprising:

the abovementioned smart device, and, the abovementioned cloud server.

A computer device, comprising a memory, a processor and a computer program which is stored on the memory and runnable on the processor, wherein the processor, upon executing the program, implements the above-mentioned method.

A computer-readable storage medium on which a computer program is stored, wherein the program, when executed by a processor, implements the aforesaid method.

As can be seen from the above introduction, according to the above solutions of the present disclosure, the smart device may receive user-input speech information and obtain a speech recognition result, then determine scenario elements associated with the speech recognition result, then generate an entry corresponding to each scenario element and send the speech recognition result and the entry to the cloud server, then receive an entry which is best matched with the speech recognition result, returned by the cloud server and selected from the received entries, and then perform an interface operation corresponding to the best-matched entry. As compared with the prior art, in the solutions of the present disclosure, it is feasible to generate and select the entry according to the user-input speech information, and then perform the interface operation according to the selected entry, no longer limited to the instructions in the instruction set, thereby improving the flexibility in speech control. Furthermore, in the solutions of the above method embodiments, screening is performed in entries sent by the smart device and corresponding to scenario elements associated with the speech recognition result, to find the entry best matched with the speech recognition result. The matching result is more accurate, and thereby improves the accuracy of speech control.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
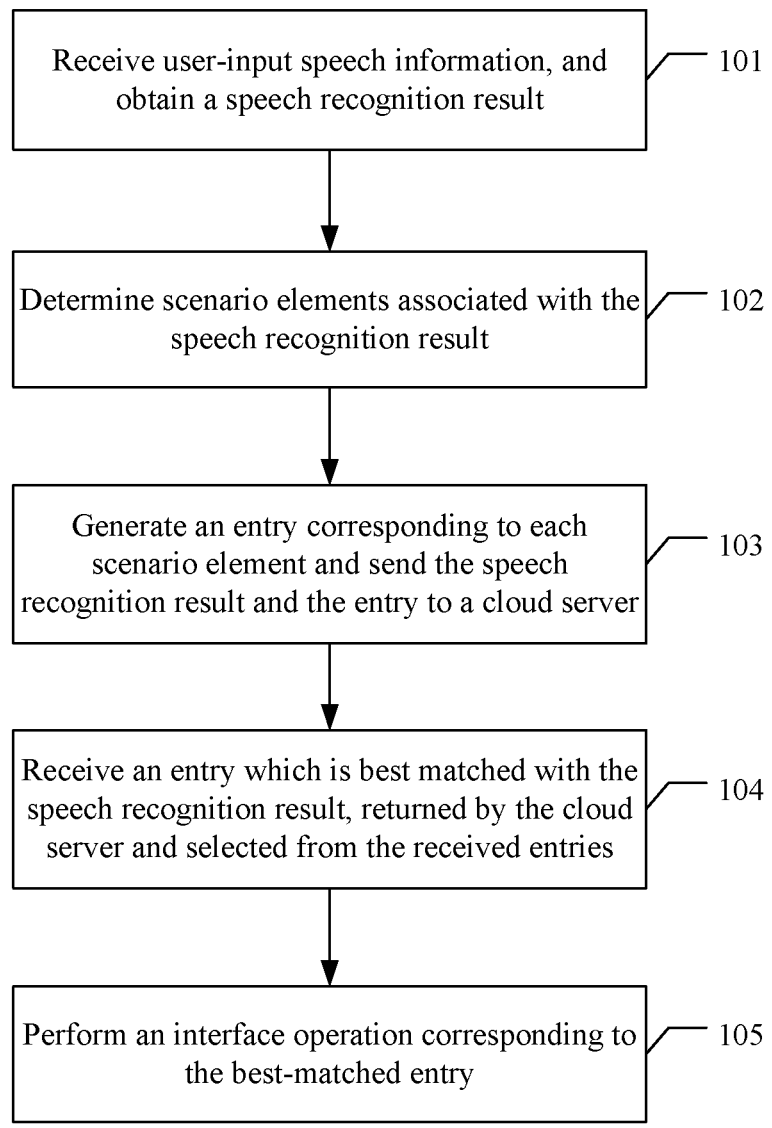
FIG. 1 is a flow chart of a first embodiment of an interface intelligent interaction control method according to the present disclosure.

FIG. 1 is a flow chart of a first embodiment of an interface intelligent interaction control method according to the present disclosure. In practical application, a subject of executing the flow shown in FIG. 1 may be a smart device. As shown in FIG. 1, the embodiment comprises the following specific implementation mode.

At 101, receive user-input speech information, and obtain a speech recognition result.

After receiving the user-input speech information, it is feasible to send it to a cloud server, and obtain a speech recognition result returned by the cloud server after performing speech recognition for the received speech information.

At 102, determine scenario elements associated with the speech recognition result.

In the present embodiment, the user may send speech information with respect to scenario elements.

The scenario elements refer to interface elements and some behaviors, e.g., operations such as turning pages, presented on the interface when the user uses a smart device having a user interface (e.g., screen). The interface elements may include button, tag, picture, list and so on. It is possible to achieve operations of these elements through speech, and enable the smart device to perform operations executable on the interface, according to the user-input speech, for example, click a certain picture, slide leftward, or slide rightward.

After obtaining the speech recognition result of the user-input speech information, it is possible to first determine a scenario element associated with the speech recognition result.

How to determine the scenario element associated with the speech recognition result is not limited, and may be determined according to actual needs, e.g., determined according to a preset rule.

For example, if the current interface displays 8 movies which are displayed in the form of a poster, and the user-input speech information is a name of one of the movies, the 8 movies may be respectively regarded as associated scenario elements.

In addition, the associated scenario elements may be displayed on the current interface, or may not be displayed on the current interface.

For example, the current interface is a main interface, three scenario elements movie, music and application respectively correspond to one sub-interface, the three scenario elements are self-defined behaviors and not displayed on the main interface, the user-input speech information is "go to movie", then movie, music and application may respectively be regarded as associated scenario elements.

At 103, generate an entry corresponding to each scenario element, and send the speech recognition result and the generated entry to the cloud server.

A corresponding entry needs to be generated for each of the associated scenario elements.

Each entry includes: an element label and a corresponding self-defined operation behavior information (url).

Wherein the label may be an element label on an interface control, e.g., an operable element label on the interface, or may be a self-defined operation label.

For example, the operable element label on the interface may refer to a name of a movie displayed on the interface, and the self-defined operation label may refer to a name of an operation self-defined by the user.

url is self-defined operation behavior information, represents a smart device behavior, and it may be any character self-defined by the user so long as the smart device can recognize its meaning.

At 104, receive an entry which is best matched with the speech recognition result, returned by the cloud server and selected from the received entries.

The cloud server may, after receiving the speech recognition result and the generated entries, select an entry best matched with the speech recognition result from the received entries according to the label, and then return the best-matched entry.

For example, for each entry, the cloud server may respectively calculate an edit distance between the element label of the entry and the speech recognition result, and then regard an entry corresponding to the edit distance with a minimum value as the best-matched entry.

At 105, perform an interface operation corresponding to the best-matched entry.

After the best-matched entry is obtained, the interface operation may be performed according to url in the best-matched entry, i.e., perform processing according to url in the best-matched entry and implement the user's control operation.

Figure 2:
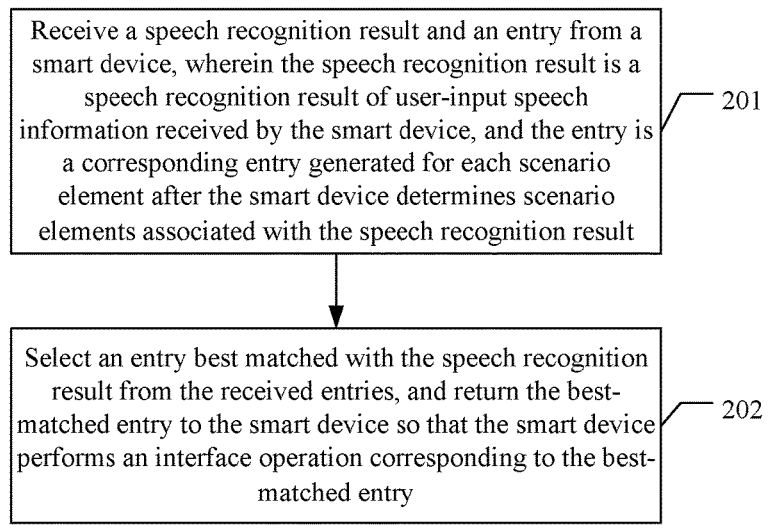
FIG. 2 is a flow chart of a second embodiment of an interface intelligent interaction control method according to the present disclosure.

FIG. 2 is a flow chart of a second embodiment of an interface intelligent interaction control method according to the present disclosure. In practical application, a subject of executing the flow shown in FIG. 2 may be a cloud server. As shown in FIG. 2, the embodiment comprises the following specific implementation mode.

At 201, receive a speech recognition result and an entry from the smart device, wherein the speech recognition result is a speech recognition result of user-input speech information received by the smart device, and the entry is a corresponding entry generated for each scenario element after the smart device determines the scenario elements associated with the speech recognition result.

After receiving the user-input speech information, the smart device may send it to the cloud server, the cloud server performs speech recognition for the received speech information to obtain the speech recognition result, and returns the speech recognition result to the smart device.

Figure 3:
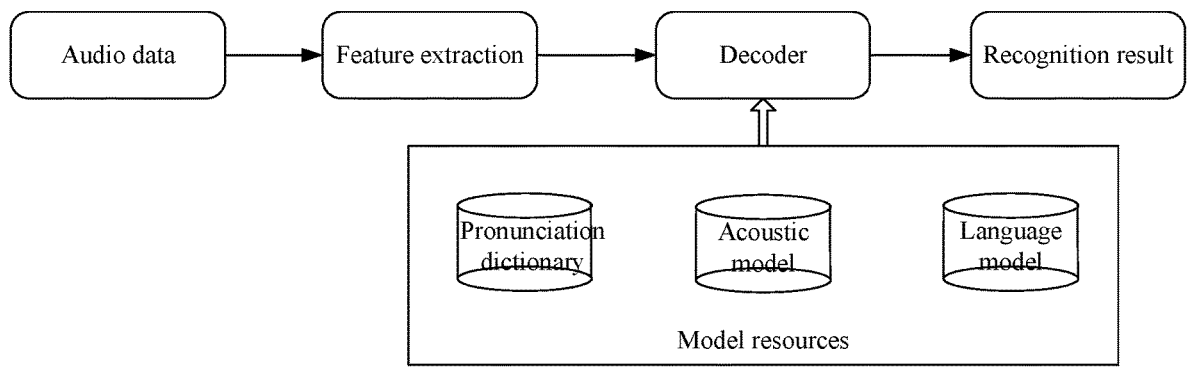
FIG. 3 is a schematic diagram of a conventional speech interaction process.

FIG. 3 is a schematic diagram of a conventional speech interaction process. As shown in FIG. 3, it is feasible to, after collecting audio data, perform feature extraction for it, and then input the extracted audio feature into a specific decoder for decoding, thereby obtaining the speech recognition result. During the decoding of the decoder, an acoustic model, a language model and a pronunciation dictionary are used. The acoustic model mainly functions to convert the audio features into syllables, the language model mainly functions to convert the syllables into a text, and the pronunciation dictionary functions to provide a syllable-to-text mapping table.

Wherein, during collection of the audio data, a sound effect may vary with difference of device performance, a distance from a sound source to the device, whether the device supports a single microphone or a microphone array, and the like. Generally speaking, if the sound-recording device has a better performance, the distance from the sound source to the device is shorter, and an effective microphone array other than a single microphone is used, audio data having more complete features and facilitating recognition can be obtained.

In addition, the collected audio data might have some problems and cannot be directly used for recognition. For example, under a hands-free or meeting application scenario, the sound from the loudspeaker is fed back to the microphone many times. As such, the audio data collected by the microphone includes acoustic echo, and echo cancellation needs to be performed by using an Acoustic Echo Cancellation (AEC) algorithm. Again for example, audio data collected under a specific environment (e.g., in a running vehicle) include specific noise, whereupon it is necessary to perform Noise Suppression (NS) processing for the collected audio data, namely, remove environmental noise by using a noise suppression algorithm.

At 202, select an entry best matched with the speech recognition result from the received entries, and return the best-matched entry to the smart device so that the smart device performs an interface operation corresponding to the best-matched entry.

As stated above, each entry may include: a label and a corresponding url.

It is possible to select the entry best matched with the speech recognition result from the received entries according to the label.

For example, it is feasible to, for each entry, respectively calculate an edit distance between the label of the entry and the speech recognition result, and then regard an entry corresponding to the edit distance with a minimum value as the best-matched entry.

Preferably, it is feasible to, after obtaining the edit distance with the minimum value, compare the edit distance with the minimum value with a preset threshold, and regard an entry corresponding to the edit distance with the minimum value as the best-matched entry if the edit distance with the minimum value is smaller than or equal to the threshold.

A specific value of the threshold may depend on actual needs. If the best-matched entry is not found, an empty result may be returned to the smart device.

In addition, each entry may further comprise one or all of the following: an x value and a y value indicative of a row position and a column position where the scenario element lies, and an index value indicative of an arrangement serial number of the scenario element. Correspondingly, it is further possible to, according to the x value and y value or according to the index value, select the entry best matched with the speech recognition result from the received entries.

If the smart device receives a non-empty entry, it may perform the interface operation corresponding to the received entry, i.e., perform processing according to the url in the entry and achieve the user's control operation.

Figure 4:
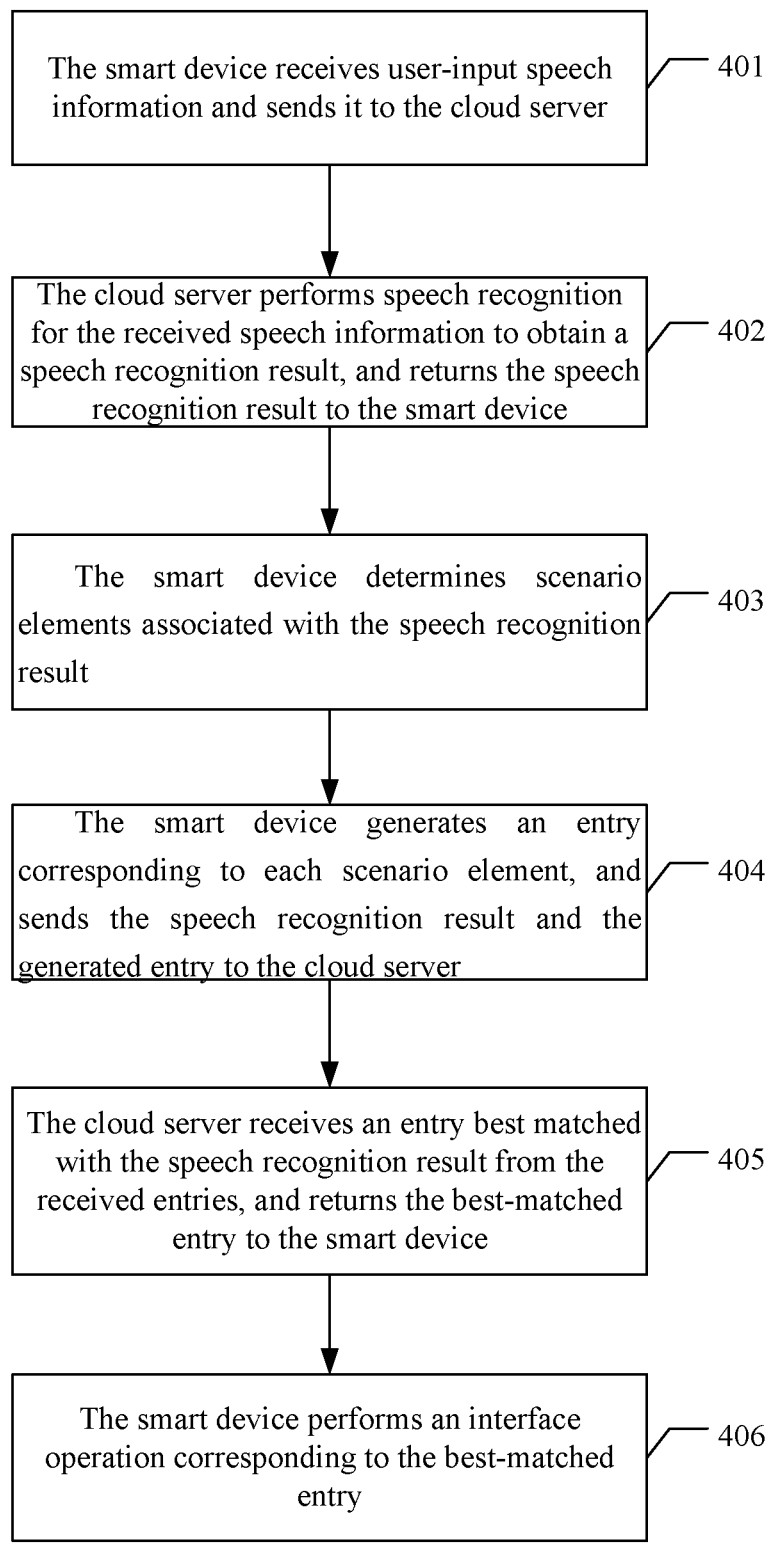
FIG. 4 is a flow chart of a third embodiment of an interface intelligent interaction control method according to the present disclosure.

Based on the above introduction, FIG. 4 is a flow chart of a third embodiment of an interface intelligent interaction control method according to the present disclosure. As shown in FIG. 4, the embodiment comprises the following specific implementation mode.

At 401, the smart device receives user-input speech information and sends it to the cloud server.

The user may input the speech information in a manner of near field speech input via a microphone or in a manner of far field speech input via a microphone array.

At 402, the cloud server performs speech recognition for the received speech information to obtain a speech recognition result, and returns the speech recognition result to the smart device.

The speech information may be converted into corresponding text information through the speech recognition.

At 403, the smart device determines scenario elements associated with the speech recognition result.

There are usually a plurality of associated scenario elements.

At 404, the smart device generates an entry corresponding to each scenario element, and sends the speech recognition result and the generated entry to the cloud server.

Each entry may include: a label and a url.

At 405, the cloud server receives an entry best matched with the speech recognition result from the received entries, and returns the best-matched entry to the smart device.

For example, for each entry, the cloud server may respectively calculate an edit distance between the label of the entry and the speech recognition result, and then regard an entry corresponding to the edit distance with a minimum value as the best-matched entry.

At 406, the smart device performs an interface operation corresponding to the best-matched entry.

The smart device performs processing according to url in received entry and implements the user's control operation.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In addition, in the above embodiments, different emphasis is placed on respective embodiments, and reference may be made to related depictions in other embodiments for portions not detailed in a certain embodiment.

The solution of the present disclosure will be further described through specific application scenarios.

1) Scenario 1

It is assumed that there are three scenario elements: movie, music and application respectively, and each scenario element corresponds to one sub-interface. The three scenario elements are self-defined behaviors and not displayed on the interface.

Assuming that the user-input speech information is "go to movie", the smart device, after receiving the speech recognition result "go to movie" returned by the cloud server, sends three entries to the cloud server, each entry including a label and a corresponding url, and sends the speech recognition result to the cloud server. The content of the labels is movie, music and application respectively, content of the url may be self-defined, e.g., may be defined as GoToMovie, GoToMusic, and GoToApps. The cloud server matches the speech recognition result "go to movie" with the label in each entry, and selects the best matched entry.

The content sent by the smart device to the cloud server may be shown as follows (take a json data format as an example):

```
{
    "query":"go to movie",
    "items":[
        {
            "label":"movie",
            "url":"GoToMovie"
        },
        {
            "label":"music",
            "url":"GoToMusic"
        },
        {
            "label":"aplication",
            "url":"GoToApps"
        }
    ]
}
```

The content returned by the cloud server to the smart device may be shown as follows:

```
{
    "label":"movie",
    "url":"GoToMovie"
}
```

After obtaining the above url, the smart device performs a corresponding operation, and jumps to a corresponding interface.

Figure 5:
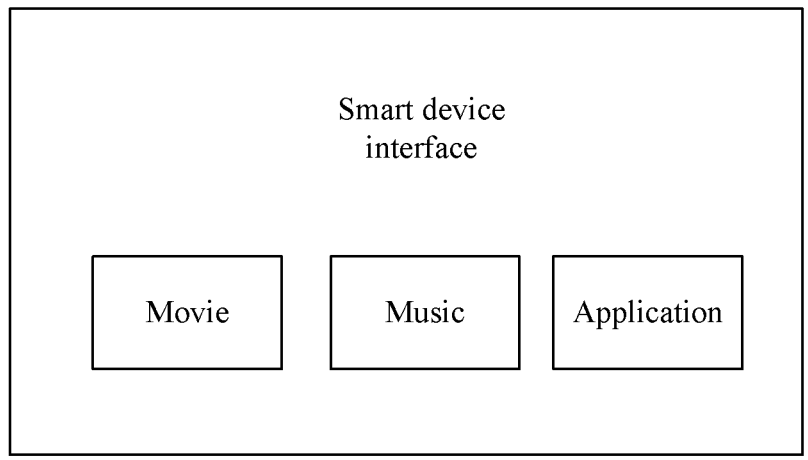
FIG. 5 is a schematic diagram of scenario elements visible on a smart device interface according to the present disclosure.

The above three scenario elements may be scenario elements visible on the smart device, as shown in FIG. 5. FIG. 5 is a schematic diagram of scenario elements visible on a smart device interface according to the present disclosure.

In this case, the url may be defined as id of movie, music and application on the interface. After obtaining the url in the best-matched entry, the smart device directly simulatively clicks a label corresponding to this id.

2) Scenario 2

Figure 6:
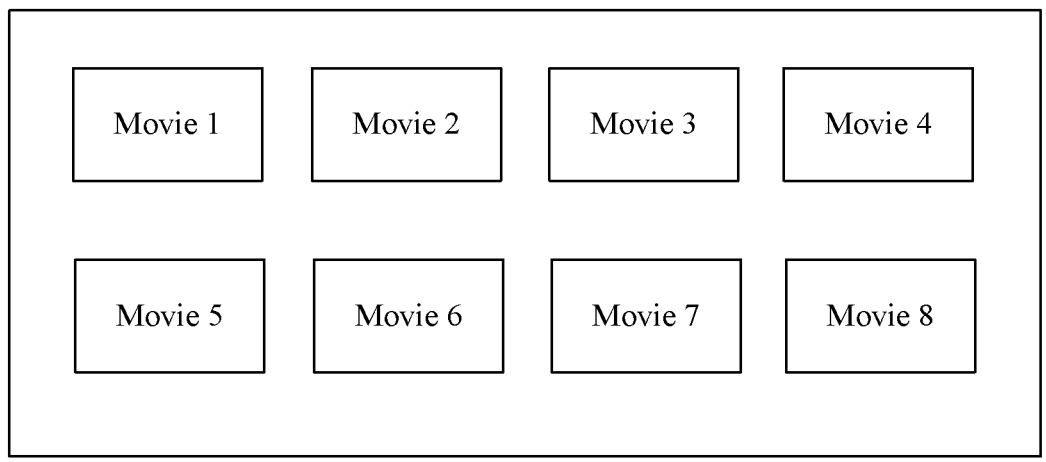
FIG. 6 is a schematic diagram of eight movies shown on a smart device interface according to the present disclosure.

It is assumed that the smart device interface displays 8 movies which are displayed in the form of a poster, as shown in FIG. 6. FIG. 6 is a schematic diagram of eight movies shown on the smart device interface according to the present disclosure.

The user may speak out the name of one of the movies in a speech manner, the smart device, after receiving the speech recognition result returned by the cloud server, sends eight entries to the cloud server, each entry including a label and a corresponding url, and sends the speech recognition result to the cloud server. The content of the label is respectively the name of each movie, and the content of url may be a playing address of the movie. The cloud server matches the speech recognition result with the label in each entry, and returns the selected best-matched entry to the smart device. It is feasible that the smart device directly plays the movie according to the url in the received entry, needless to re-search movies, thereby more precisely implementing the user's playing intention.

The content sent by the smart device to the cloud server may be shown as follows:

```
{
    "query":"movie 1",
    "items":[
        {
            "label":"movie1",
            "url":"www.xxx.com/movie1"
        },
        {
            "label":"movie 2",
            "url":"www.xxx.com/movie2"
        },
        {
            "label":"movie 3",
            "url":"www.xxx.com/movie3"
        },
        {
            "label":"movie 4",
            "url":"www.xxx.com/movie4"
        },
        {
            "label":"movie 5",
            "url":"www.xxx.com/movie5"
        },
        {
            "label":"movie 6",
            "url":"www.xxx.com/movie6"
        },
        {
            "label":"movie 7",
            "url":"www.xxx.com/movie7"
        },
        {
            "label":"movie 8",
            "url":"www.xxx.com/movie8"
        }
    ]
}
```

The content returned by the cloud server to the smart device may be shown as follows:

```
{
    "label":"movie 1",
    "url":"www.xxx.com/movie1"
}
```

In scenario 1 and scenario 2, upon selecting the best-matched entry, the cloud server may respectively calculate an edit distance between the label of the entry and the speech recognition result, and then regard an entry corresponding to the edit distance with a minimum value as the best-matched entry.

Specifically, it is feasible to calculate the edit distance between words of the label and words of the speech recognition result, or calculate the edit distance between pinyin of the label and pinyin the speech recognition result.

The edit distance, also called Levenshtein distance, refers to minimum times of editing operations for converting from one character string to the other character string between two character strings. A permissible editing operation includes replacing one character with another character, inserting a character, and deleting a character. Generally, the smaller the edit distance is, the larger a similarity between the two character strings is.

In practical application, each entry may include, besides the label and the url, some other content, for example, an x value and a y value, and an index value. Correspondingly, it is possible to perform matching according to the x value and y value or the index value, as shown in scenario 3.

3) Scenario 3

It is assumed that the smart device interface displays 8 movies which are displayed in the form of a poster, as shown in FIG. 6.

The user may speak out "the first of the second row" in a speech manner, the smart device, after receiving the speech recognition result returned by the cloud server, sends eight entries to the cloud server, each entry including a label, a corresponding url, an x value and y value, and an index value, and sends the speech recognition result to the cloud server. The content of the label is respectively the name of each movie, the url may include a playing address of the movie, and the x value and y value represent a row position and a column position where the movie lies, for example, the x value represents the row where the movie lies, and the y value represents the column where the movie lies, and the index value represents an arrangement serial number of the movie. The cloud server may select the best-matched entry according to the x value and the y value, and return it to the smart device. It is feasible that the smart device directly plays the movie according to the url in the received entry.

The content sent by the smart device to the cloud server may be shown as follows:

```
{
    "query": the first of the second row,
    "items":[
        {
            "label":"movie 1",
            "url":"www.xxx.com/movie1","x":1,"y":1,"index":1
        },
        {
            "label":"movie 2",
            "url":"www.xxx.com/movie2","x":1,"y":2,"index":2
        },
        {
            "label":"movie 3",
            "url":"www.xxx.com/movie3","x":1,"y":3,"index":3
        },
        {
            "label":"movie 4",
            "url":"www.xxx.com/movie4","x":1,"y":4,"index":4
        },
        {
            "label":"movie 5",
            "url":"www.xxx.com/movie5","x":2,"y":1,"index":5
        },
        {
            "label":"movie 6",
            "url":"www.xxx.com/movie6","x":2,"y":2,"index":6
        },
        {
            "label":"movie 7",
            "url":"www.xxx.com/movie7","x":2,"y":3,"index":7
        },
        {
            "label":"movie 8",
            "url":"www.xxx.com/movie8","x":2,"y":4,"index":8
        }
    ]
}
```

The content returned by the cloud server to the smart device may be shown as follows:

```
{
    "label":"movie 5",
    "url":"www.xxx.com/movie5","x":2,"y":1,"index":5
}
```

In addition, if the user-input speech is "the $*^{th}$", a corresponding entry may be selected according to the index value.

In practical application, if the system only supports the manner of matching the entry through the name of the movie in scenario 2, the generated entry may only include the label and the ur. If the system simultaneously supports the entry-matching manners "the first of the second row" and "the $*^{th}$" stated in scenario 3, the generated entry needs to further include the x value and y value, and the index value.

In summary, in the solutions of the above method embodiments, it is feasible to generate and select the entry according to the user-input speech information, and then perform the interface operation according to the selected entry, no longer limited to the instructions in the instruction set, thereby improving the flexibility in speech control. Furthermore, in the solutions of the above method embodiments, screening is performed in entries sent by the smart device and corresponding to scenario elements associated with the speech recognition result, to find the entry best matched with the speech recognition result. The matching result is more accurate, and thereby improves the accuracy of speech control.

The above introduces the method embodiments. The solution of the present disclosure will be further described through an apparatus embodiment.

Figure 7:
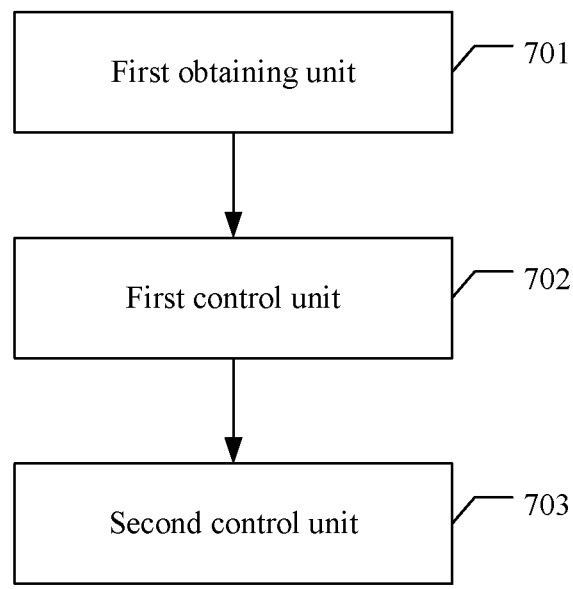
FIG. 7 is a structural schematic diagram of components of an embodiment of a smart device according to the present disclosure.

FIG. 7 is a structural schematic diagram of components of an embodiment of a smart device according to the present disclosure. As shown in FIG. 7, the apparatus comprises: a first obtaining unit 701, a first control unit 702 and a second control unit 703.

The first obtaining unit 701 is configured to receive user-input speech information, and obtain a speech recognition result.

The first control unit 702 is configured to determine scenario elements associated with the speech recognition result, generate an entry corresponding to each scenario element, send the speech recognition result and the entry to the cloud server, and receive an entry which is best matched with the speech recognition result, returned by the cloud server and selected from the received entries.

The second control unit 703 is configured to perform an interface operation corresponding to the best-matched entry.

The first obtaining unit 701, after receiving the user-input speech information, may send it to the cloud server, and obtain a speech recognition result returned by the cloud server after performing speech recognition for the received speech information.

Then, the first control unit 702 may determine scenario elements associated with the speech recognition result.

The scenario elements refer to interface elements and some behaviors, e.g., operations such as turning pages, presented on the interface when the user uses a smart device having a user interface (e.g., screen). The interface elements may include button, tag, picture, list and so on. It is possible to achieve operations of these elements through speech, and enable the smart device to perform operations executable on the interface, according to the user-input speech, for example, click a certain picture, slide leftward, or slide rightward.

How to determine the scenario element associated with the speech recognition result is not limited, and may be determined according to actual needs, e.g., determined according to a preset rule.

The first control unit 702 further needs to generate an entry corresponding to each scenario element, and send the speech recognition result and the generated entry to the cloud server.

Each entry includes: an element label and a corresponding self-defined operation behavior information (url).

The cloud server may, after receiving the speech recognition result and the generated entries from the smart device, select an entry best matched with the speech recognition result from the received entries according to the label, and then return the best-matched entry.

Correspondingly, the second control unit 703 may perform an interface operation according to the url in the best-matched entry.

Figure 8:
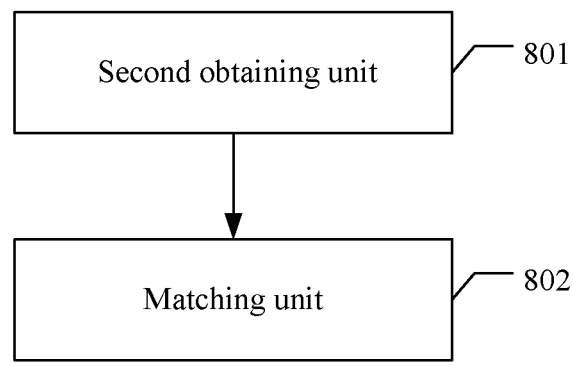
FIG. 8 is a structural schematic diagram of components of an embodiment of a cloud server according to the present disclosure.

FIG. 8 is a structural schematic diagram of components of an embodiment of a cloud server according to the present disclosure. As shown in FIG. 8, the cloud server comprises: a second obtaining unit 801 and a matching unit 802.

The second obtaining unit 801 is configured to receive a speech recognition result and an entry from the smart device, wherein the speech recognition result is a speech recognition result of user-input speech information received by the smart device, and the entry is a corresponding entry generated for each scenario element after the smart device determines the scenario elements associated with the speech recognition result.

The matching unit 802 is configured to select an entry best matched with the speech recognition result from the received entries, and return the best-matched entry to the smart device so that the smart device performs an interface operation corresponding to the best-matched entry.

Wherein the second obtaining unit 801 may, before receiving the speech recognition result and the entry from the smart device, receive the speech information sent from the smart device, perform speech recognition for the speech information to obtain a speech recognition result, and return the speech recognition result to the smart device.

Each entry may include: a label and a corresponding url.

The matching unit 802 may select the entry best matched with the speech recognition result from the received entries according to the label.

For example, the matching unit 802 may, for each entry, respectively calculate an edit distance between the label of the entry and the speech recognition result, and then regard an entry corresponding to the edit distance with a minimum value as the best-matched entry.

In addition, each entry may further comprise one or all of the following: an x value and a y value indicative of a row position and a column position where the scenario element lies, and an index value indicative of an arrangement serial number of the scenario element.

Correspondingly, the matching unit 802 may, according to the x value and y value or according to the index value, select the entry best matched with the speech recognition result from the received entries.

Reference may be made to corresponding depictions in the aforesaid method embodiments for a specific workflow of the apparatus embodiments shown in FIG. 7 and FIG. 8. The workflow is not detailed any more.

In addition, in practical application, the server shown in FIG. 8 may be further divided into two servers, wherein one is used to perform speech recognition, and the other is used to perform an operation such as matching. Specific implementation modes are not limited.

Furthermore, the present disclosure meanwhile discloses an interface intelligent interaction control system, comprising: the smart device in the embodiment shown in FIG. 7 and the cloud server in the embodiment as shown in FIG. 8. Specific implementations are not detailed any longer.

Figure 9:
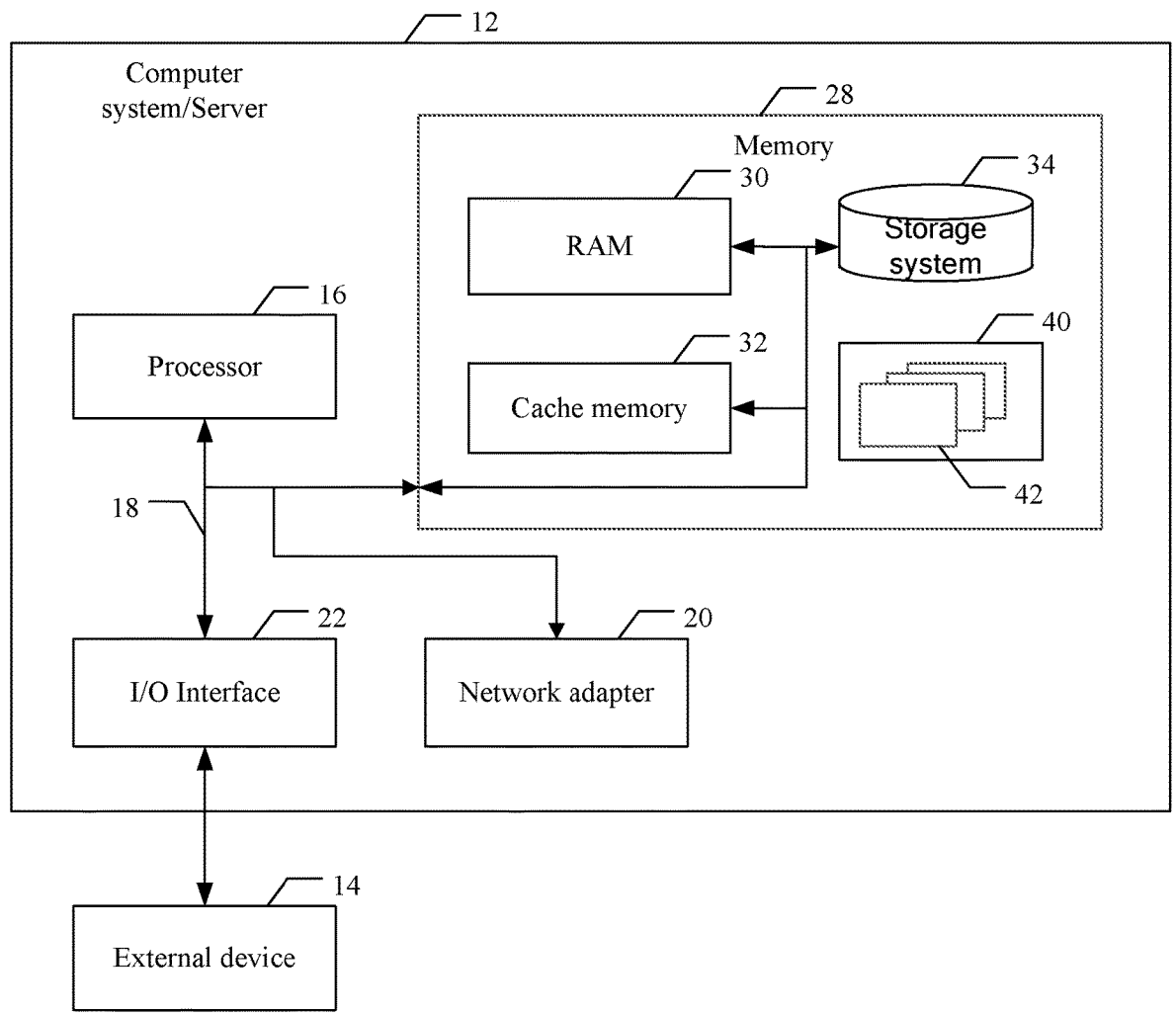
FIG. 9 illustrates a block diagram of an example computer system/server 12 adapted to implement an implementation mode of the present disclosure.

FIG. 9 illustrates a block diagram of an example computer system/server 12 adapted to implement an implementation mode of the present disclosure. The computer system/server 12 shown in FIG. 9 is only an example and should not bring about any limitation to the function and scope of use of the embodiments of the present disclosure.

As shown in FIG. 9, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 9 and typically called a "hard drive"). Although not shown in FIG. 9, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 9, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1, 2 or 4, namely, receive user-input speech information, and obtain a speech recognition result; determine scenario elements associated with the speech recognition result; generate an entry corresponding to each scenario element, send the speech recognition result and the entry to the cloud server, and receive an entry which is best matched with the speech recognition result, returned by the cloud server and selected from the received entries; perform an interface operation corresponding to the best-matched entry.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1. 2 or 4.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An interface intelligent interaction control method, wherein the method comprises:
   receiving, by a smart device, user-input speech information, and obtaining, by the smart device, a speech recognition result;
   determining, by the smart device, scenario elements associated with the speech recognition result, wherein the scenario elements comprise an interface element presented on a screen of the smart device;
   generating, by the smart device, entries, each entry corresponding to each scenario element and sending the speech recognition result and the entries to a cloud server;
   receiving, by the smart device, an entry, which is best matched with the speech recognition result, returned by the cloud server and selected by the cloud server from the received entries received from the smart device; and performing, by the smart device an interface operation corresponding to the best-matched entry.

2. The method according to claim 1, wherein
the obtaining, by the smart device, the speech recognition result comprises:
   sending, by the smart device, the speech information to the cloud server; and
   receiving, by the smart device, the speech recognition result returned by the cloud server after performing speech recognition for the speech information.

3. The method according to claim 1, wherein
each entry of the entries generated by the smart device includes: an element label and a corresponding self-defined operation behavior information; and
the performing an interface operation corresponding to the best-matched entry comprises:
performing an interface operation according to the self-defined operation behavior information in the best-matched entry.

4. An interface intelligent interaction control method, wherein the method comprises:
   receiving, by a cloud server, a speech recognition result and entries from a smart device, wherein the speech recognition result is a speech recognition result of user-input speech information received by the smart device, and each of the entries is a corresponding entry generated for each scenario element after the smart device determines scenario elements associated with the speech recognition result, wherein the scenario elements comprise an interface element presented on a screen of the smart device; and
   selecting, by the cloud server, an entry best matched with the speech recognition result from the received entries, and returning, by the cloud server, the best-matched entry to the smart device so that the smart device performs an interface operation corresponding to the best-matched entry.

5. The method according to claim 4, wherein before receiving, by the cloud server, the speech recognition result and the entries from the smart device, the method further comprises:
   receiving, by the cloud server, the speech information sent from the smart device; and
   performing, by the cloud server, speech recognition for the speech information to obtain the speech recognition result, and returning the speech recognition result to the smart device.

6. The method according to claim 4, wherein
each of the entries received from the smart device includes: an element label and a corresponding self-defined operation behavior information;
the selecting, by the cloud server, the entry best matched with the speech recognition result from the received entries comprises:
selecting, by the cloud server, the entry best matched with the speech recognition result from the received entries, according to the element label.

7. The method according to claim 6, wherein
the selecting, by the cloud server, the entry best matched with the speech
recognition result from the received entries, according to the element label comprises:
for each entry of the entries received from the smart device, respectively calculating an edit distance between the element label of the entry and the speech recognition result; and regarding an entry corresponding to the edit distance with a minimum value as the best-matched entry,
wherein the edit distance comprises minimum times of editing operations for converting from one character string to the other character string between two character strings.

8. The method according to claim 6, wherein
each entry of the entries received from the smart device further comprises one or all of the following: an x value and a y value indicative of a row position and a column position where the scenario element lies, and an index value indicative of an arrangement serial number of the scenario element; and
the selecting, by the cloud server, the entry best matched with the speech recognition result from the received entries comprises:
according to the x value and y value or according to the index value, selecting the entry best matched with the speech recognition result from the received entries.

9. A smart device, comprising a memory, a processor and a computer program which is stored on the memory and runnable on the processor, wherein the processor, upon executing the program, implements an interface intelligent interaction control method, wherein the method comprises:
   receiving, by the smart device, user-input speech information, and obtaining, by the smart device, a speech recognition result;
   determining, by the smart device, scenario elements associated with the speech recognition result, wherein the scenario elements comprise an interface element presented on a screen of the smart device;
   generating, by the smart device, entries, each entry corresponding to each scenario element and sending the speech recognition result and the entries to a cloud server;
   receiving, by the smart device, an entry, which is best matched with the speech recognition result, returned by the cloud server and selected by the cloud server from the entries received from the smart device; and
   performing, by the smart device, an interface operation corresponding to the best-matched entry.

10. The smart device according to claim 9, wherein the obtaining, by the smart device, the speech recognition result comprises:
   sending, by the smart device, the speech information to the cloud server; and
   receiving, by the smart device, the speech recognition result returned by the cloud server after performing speech recognition for the speech information.

11. The smart device according to claim 9, wherein each of the entries generated by the smart device includes: an element label and a corresponding self-defined operation behavior information; and
   the performing an interface operation corresponding to the best-matched entry comprises:
   performing an interface operation according to the self-defined operation behavior information in the best-matched entry.

12. A non-transitory computer-readable storage medium on which a computer program is stored, wherein the computer program, when executed by a processor of a smart device, implements an interface intelligent interaction control method, wherein the method comprises:
   receiving, by the smart device, user-input speech information, and obtaining, by the smart device, a speech recognition result;

determining, by the smart device, scenario elements associated with the speech recognition result, wherein the scenario elements comprise an interface element presented on a screen of the smart device;

generating, by the smart device, entries, each entry corresponding to each scenario element and sending the speech recognition result and the entries to a cloud server;

receiving, by the smart device, an entry, which is best matched with the speech recognition result, returned by the cloud server and selected by the cloud server from the entries received from the smart device; and performing, by the smart device, an interface operation corresponding to the best-matched entry.

13. The non-transitory computer-readable storage medium according to claim 12, wherein the obtaining, by the smart device, the speech recognition result comprises:

sending, by the smart device, the speech information to the cloud server; and receiving, by the smart device, the speech recognition result returned by the cloud server after performing speech recognition for the speech information.

14. The non-transitory computer-readable storage medium according to claim 12, wherein each of the entries generated by the smart device includes: an element label and a corresponding self-defined operation behavior information; and the performing an interface operation corresponding to the best-matched entry comprises: performing an interface operation according to the self-defined operation behavior information in the best-matched entry.

15. A computer device, comprising a memory, a processor and a computer program which is stored on the memory and runnable on the processor, wherein the processor, upon executing the program, implements an interface intelligent interaction control method, wherein the method comprises:

receiving, by the computer device, a speech recognition result and entries from a smart device, wherein the speech recognition result is a speech recognition result of user-input speech information received by the smart device, and each of the entries is a corresponding entry generated for each scenario element after the smart device determines scenario elements associated with the speech recognition result, wherein the scenario elements comprise an interface element presented on a screen of the smart device; and selecting, by the computer device, an entry best matched with the speech recognition result from the received entries, and returning, by the computer device, the best-matched entry to the smart device so that the smart device performs an interface operation corresponding to the best-matched entry.

16. The computer device according to claim 15, wherein before receiving, by the computer device, the speech recognition result and the entries from the smart device, the method further comprises:

receiving, by the computer device, the speech information sent from the smart device; and performing, by the computer device, speech recognition for the speech information to obtain the speech recognition result, and returning the speech recognition result to the smart device.

17. The computer device according to claim 15, wherein each of the entries received from the smart device includes: a label and a corresponding self-defined operation behavior information;

the selecting, by the computer device, the entry best matched with the speech recognition result from the received entries comprises:

selecting, by the computer device, the entry best matched with the speech recognition result from the received entries, according to the element label.

18. The computer device according to claim 17, wherein the selecting, by the computer device, the entry best matched with the speech recognition result from the received entries, according to the element label comprises:

for each entry of the entries received from the smart device, respectively calculating an edit distance between the element label of the entry and the speech recognition result; and regarding an entry corresponding to the edit distance with a minimum value as the best-matched entry, wherein the edit distance comprises minimum times of editing operations for converting from one character string to the other character string between two character strings.

19. The computer device according to claim 17, wherein each of the entires received from the smart device further comprises one or all of the following: an x value and a y value indicative of a row position and a column position where the scenario element lies, and an index value indicative of an arrangement serial number of the scenario element; and the selecting, by the computer device, the entry best matched with the speech recognition result from the received entries comprises:

according to the x value and y value or according to the index value, selecting the entry best matched with the speech recognition result from the received entries.

20. A non-transitory computer-readable storage medium on which a computer program is stored, wherein the computer program, when executed by a processor of a computer device, implements an interface intelligent interaction control method, wherein the method comprises:

receiving, by the computer device, a speech recognition result and entries from a smart device, wherein the speech recognition result is a speech recognition result of user-input speech information received by the smart device, and each of the entries is a corresponding entry generated for each scenario element after the smart device determines scenario elements associated with the speech recognition result, wherein the scenario elements comprise an interface element presented on a screen of the smart device; and selecting, by the computer device, an entry best matched with the speech recognition result from the received entries, and returning, by the computer device, the best-matched entry to the smart device so that the smart device performs an interface operation corresponding to the best-matched entry.

* * * * *